United States Patent [19]
Fischer et al.

[11] Patent Number: 5,146,423
[45] Date of Patent: Sep. 8, 1992

[54] CIRCUIT ARRANGEMENT FOR ADDING OR SUBTRACTING OPERANDS CODED IN BCD-CODE OR BINARY-CODE

[75] Inventors: Horst Fischer, Haar; Wolfgang Rohsaint, Munich, both of Fed. Rep. of Germany

[73] Assignee: Siemens Aktiengesellschaft, Munich, Fed. Rep. of Germany

[21] Appl. No.: 613,889

[22] PCT Filed: Aug. 31, 1989

[86] PCT No.: PCT/DE89/00569
§ 371 Date: Dec. 7, 1990
§ 102(e) Date: Dec. 7, 1990

[87] PCT Pub. No.: WO90/02994
PCT Pub. Date: Mar. 22, 1990

[30] Foreign Application Priority Data
Sep. 9, 1988 [EP] European Pat. Off. ........ 88114781.3

[51] Int. Cl.$^5$ ............................................. G06F 7/50
[52] U.S. Cl. ................................................. 364/771
[58] Field of Search ................ 364/771, 778, 781, 789

[56] References Cited
U.S. PATENT DOCUMENTS

| | | | |
|---|---|---|---|
| 3,339,064 | 8/1967 | Koizumi et al. | 364/771 |
| 3,935,438 | 1/1976 | Grupe | 364/771 |
| 3,958,112 | 5/1976 | Miller | 364/771 |
| 4,441,159 | 4/1984 | Hart | 364/771 |

FOREIGN PATENT DOCUMENTS
0098539 6/1983 European Pat. Off. .

OTHER PUBLICATIONS
IC'S Make Parallel Arithmetic Practical, by P. Kintner, Control Engineering, Oct. 1972, pp. 48–49.

*Primary Examiner*—Long T. Nguyen
*Attorney, Agent, or Firm*—Hill, Van Santen, Steadman & Simpson

[57] ABSTRACT

It is possible to add or subtract operands coded in binary coded decimal (BCD) code or in the binary code with the circuit arrangement upon employment of a single binary adder. In order to enable BCD operations, the BCD operations are supplied to the binary adder (DA) via input stages (EG1, EG2). The one input stage (EG1) inverts the allocated operand (A) when this operand has a minus sign. The other input stage (EG2) edits the allocated operand (B) such that, given positive operands, (A, B), the number 6 is added to the allocated operand (B) and the result is inverted given negative operands (A, B). Given operands in the binary code, the allocated operands are inverted when they are provided with a minus sign; otherwise, they are not influenced. After the operation of the edited operands (X, Y) in the binary adder (DA), a correction of the sum result (S) can be required given BCD operation. This is the case when a carry signal (C) in the binary operation in the binary adder (DA) has appeared at the most significant place of the sum result. In this case the number 6 is subtracted from the sum result (S) in an output stage (AGS). This leads to the corrected sum (R). Upon employment of a single binary adder, it is possible to add and to subtract BCD numbers and binary numbers with the circuit arrangement.

11 Claims, 3 Drawing Sheets

CIRCUIT ARRANGEMENT FOR ADDING OR SUBTRACTING OPERANDS CODED IN BCD-CODE OR BINARY-CODE

BACKGROUND OF THE INVENTION

The invention is directed to a circuit arrangement for adding or subtracting operands coded in BCD-code or binary-code upon employment of a binary adder.

Up to now, different circuit arrangements have been proposed for adding or subtracting operands coded in binary code or BCD code. Given additions or subtractions of operands in the binary code, a circuit for generating a one's or a two's complement was thereby necessary. Given BCD operands, by contrast, a circuit for generating the nine's complement was required.

Binary adders are known (see, for example, U. Tietze, Ch. Schenk, Halbleiterschaltungstechnik, 4th Edition, Springer Verlag, Berlin Heidelberg New York, 1978, pages 475, 476). It is also known to add or subtract BCD numbers upon employment of binary adders. Two binary adders, however, are required for this purpose. (See op. cit., page 477). The second binary adder is required in order to correct the result of the first binary adder. This is necessary when a carry occurs in a decade. A 6 must then be added to the result of the first binary adder. This BCD number, however, can contain a pseudo-tetrade. In this case, the number 6 must still be added in order to eliminate the pseudo-tetrade. The correction of the result of the first binary adder ensues with the assistance of the second binary adder. The overall outlay for the circuit arrangement for adding PCD numbers is thus relatively great and the circuit works relatively slowly.

SUMMARY OF THE INVENTION

The object on which the invention is based is comprised in specifying a circuit arrangement of the species initially set forth that edits a 4-bit-wide datum of an operand such that both binary as well as BCD additions and subtractions can be implemented with a single binary adder.

This object is achieved by a circuit arrangement for adding or subtracting 4-bit first and second operands coded in one of BCD-code or binary code upon employment of a binary added, comprising: a first input stage connected preceding a first input of the binary adder for receiving the first operand, said first input stage adding the number 6 to said first operand given operations of BVD operands with positive operands; adding the number 6 to said first operand given negative operands and negating the result; not modifying said operand given different operational signals of the two operands and positive operational sign of said first operand; negating said first operand given different operational signs of the two operands given negative operational signal of said first operand; negating said first operand but not otherwise modifying it given operations of operands in the binary code with a negative said first operand; a second input stage, that, receiving a negative, second operand, negates this but otherwise leaves it unmodified, connected preceding a second input of the binary adder; an output stage connected to a sum output of the binary adder, said output stage given BCD operations of the first and second operands and non-presence of a carry on a carry output of the binary adder, subtracting the number 6 from a sum result on the sum output of the binary adder in order to generate a corrected sum but otherwise not influencing the sum result.

The number 6 is added to one of the operands when required given binary additions or, respectively, subtractions, being added with the assistance of input stages that are switched by the binary adders. This is valid when a BCD addition is present and both operands are positive or negative. When only one of the operands is negative, then this operand is negated. By contrast, the input stages handle binary numbers such that they are only modified when the operands are negative. In this case, they are negated.

The sum output by the binary adder is corrected as needed with the assistance of the output stage. This is required when no carry has appeared in the BCD addition. In this case, the number 6 must be subtracted from the result of the binary adder.

A circuit arrangement constructed in such fashion having correspondingly constructed input stages and a correspondingly constructed output stage does not require two binary adders. The editing of the operands and the correction of the result of the binary adder can ensue only with circuits that employ multiplexers and logical elements. This enables a surveyable layout of the circuits and has the advantage that such a circuit arrangement can be employed as cell in a CAD system.

BRIEF DESCRIPTION OF THE DRAWINGS
employed as cell in a CAD system.

The invention shall be set forth in further detail with reference to an exemplary embodiment that is shown in the figures. Shown are.

DESCRIPTION OF THE PREFERRED EMBODIMENTS

Figure 1:
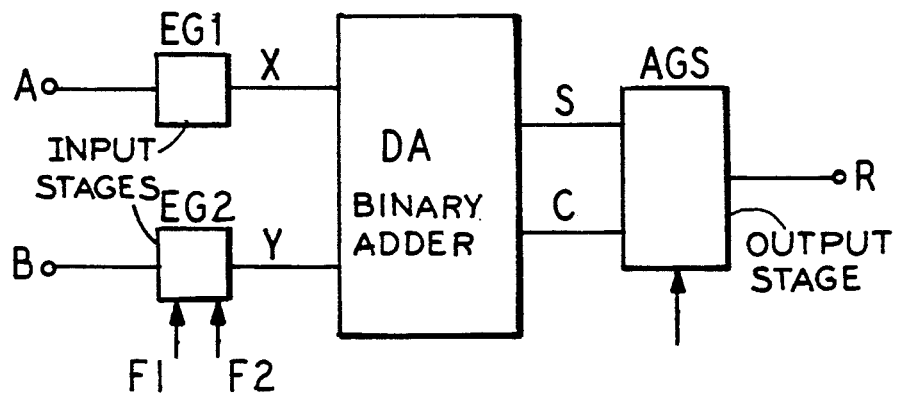
FIG. 1 a block circuit diagram of the circuit arrangement.

FIG. 1 shows the block circuit diagram of the circuit arrangement. A binary adder DA that implements the operation of the operands is employed in the circuit arrangement. Binary adders are known and need not be described in further detail.

When additions of positive primary numbers A and B is implemented with such a binary adder, then the operands A and B need not be edited before the addition. When, by contrast, one of the operands A and B is negative, then this operand is supplied to the binary adder negated.

The conditions are different when the operands A and B are coded in the BCD code. Here, the operands must be edited before the addition with the binary adder. This ensues with the assistance of input stages EG1 and EG2. The input stage EG1 converts the operand A into the edited operand X; the input stage EG2 converts the operand B into the edited operand Y. In BCD additions and subtractions, the result S, the sum result of the binary adder DA must be corrected in some cases. This ensues with the assistance of the output stage AGS that carries out the correction dependent on the carry C in BCD operations. This correction is not required given operations of operands in the binary code; in this case, the result S of the binary adder DA is through-connected to the output uninfluenced by the output stage AGS.

The function of the input stages EG shall be set forth first, followed by that of the output stage AGS.

TABLE 1

|  | Y (BCD) | X (BCD) | Y (binary) | X (binary) |
|---|---|---|---|---|
| a (i) + b (i) | B + 6 | A | B | A |
| −a (i) − b (i) | $\overline{B+6}$ | $\overline{A}$ | $\overline{B}$ | $\overline{A}$ |
| −a (i) + b (i) | B | $\overline{A}$ | B | $\overline{A}$ |
| a (i) − b (i) | $\overline{B}$ | A | $\overline{B}$ | A |

How the operands A and B are to be edited in order to be able to implement the desired operation with a single dual adder can be derived from Table 1. The first column shows the desired operation of the operands A and B; the second column shows how the operand B must be edited in the BCD operation; the third column shows how the operand A is to be edited in the BCD operation; the fourth column shows the influencing of the operand B in binary operation; and the first column shows the influencing of the operand A in binary operation.

It may be seen that the operands A and B are not influenced given binary operations with positive operands A and B; when, by contrast, one of the operands is negative, this operand is negated.

In BCD operations, the number 6 is added to one of the two operands in a BCD addition. This is the operand B in the case of Table 1. The other operand A, by contrast, is not influenced.

Two instances must be distinguished in BCD subtractions. Both operands A, B are negative in the critical instance. One of the operands, for example the operand A is then negated, the number 6 is added to the other operand, for example to the operand B, and this sum is then negated. In that instance wherein only one of the operands is provided with a minus sign, this operand is negated but the other operand, by contrast, is left uninfluenced.

In the exemplary embodiment, thus, the operand B is essentially influenced; this occurs with the assistance of the input stage EG2. Of course, the other operand A could also be correspondingly influenced.

When, in a BCD operation, operands edited in such fashion have been binarily operated with the assistance of the binary adder DA, then the sum S output by the binary adder DA must be corrected in some instances. This ensues with the assistance of the output stage AGS. A correction of the value S must ensue when the sum S is less than 10. This is indicated by the carry of the highest bit place of the sum S; this is then logical 0. The correction ensues in that the number 6 is subtracted from the sum S. This ensues in the output stage AGS. When, by contrast, the sum S is equal to or greater than 10 or when a binary operation is present, then the result S of the dual adder DA need not be modified and is output uninfluenced at the output of the output stage AGS as result R.

Whereas the editing of the operand A to form the modified operand X involves no difficulties in the exemplary embodiment, since only a negation ensues here when the operand A has a minus sign, the realization of the input stage EG2 is more complicated. Various instances must be distinguished here. The various instances derive from Table 1 and from the following Table 2. The symbol # is used hereinafter to denote an exclusive-OR operation on the terms preceding and following the symbol #.

TABLE 2

| F1 | F2 | y0 | y1 | y2 | | y3 | |
|---|---|---|---|---|---|---|---|
| 0 | 0 | b0 | $\overline{b1}$ | b2 | $\overline{b1}$ | b3 | (b2 + b1) |
| 0 | 1 | $\overline{b0}$ | b1 | b2 | b1 | b3 | $\overline{(b2+b1)}$ |
| 1 | 0 | b0 | b1 | b2 | | b3 | |
| 1 | 1 | $\overline{b0}$ | $\overline{b1}$ | $\overline{b2}$ | | $\overline{b3}$ | |

The various instances are distinguished by function signals F1 and F2 that are supplied to the input stage EG2. The function signal F1 indicates whether the number 6 should be added or not; the function signal F2 indicates whether the operands are to be negated. Four instances of the second column of Table 1 can thus be distinguished. It may be seen from Table 2 how the individual bit places of the edited operand Y derive by operation of the bit places of the operand B. When the function signal F1 is logical 0, when the number 6 must be added to the operand B. When, in addition, the function signal F2 is logical 0, then the result need not be inverted; otherwise, an inversion is required. These two instances are written down in the first two lines of Table 2. When the function signal F1 is logical 1, then no addition of 6 to the operand B is required. Dependent on the function signal F2, the operand B is now only negated or not negated. The corresponding results for the edited operand Y derive from lines 3 and 4 of Table 2.

Figure 2:
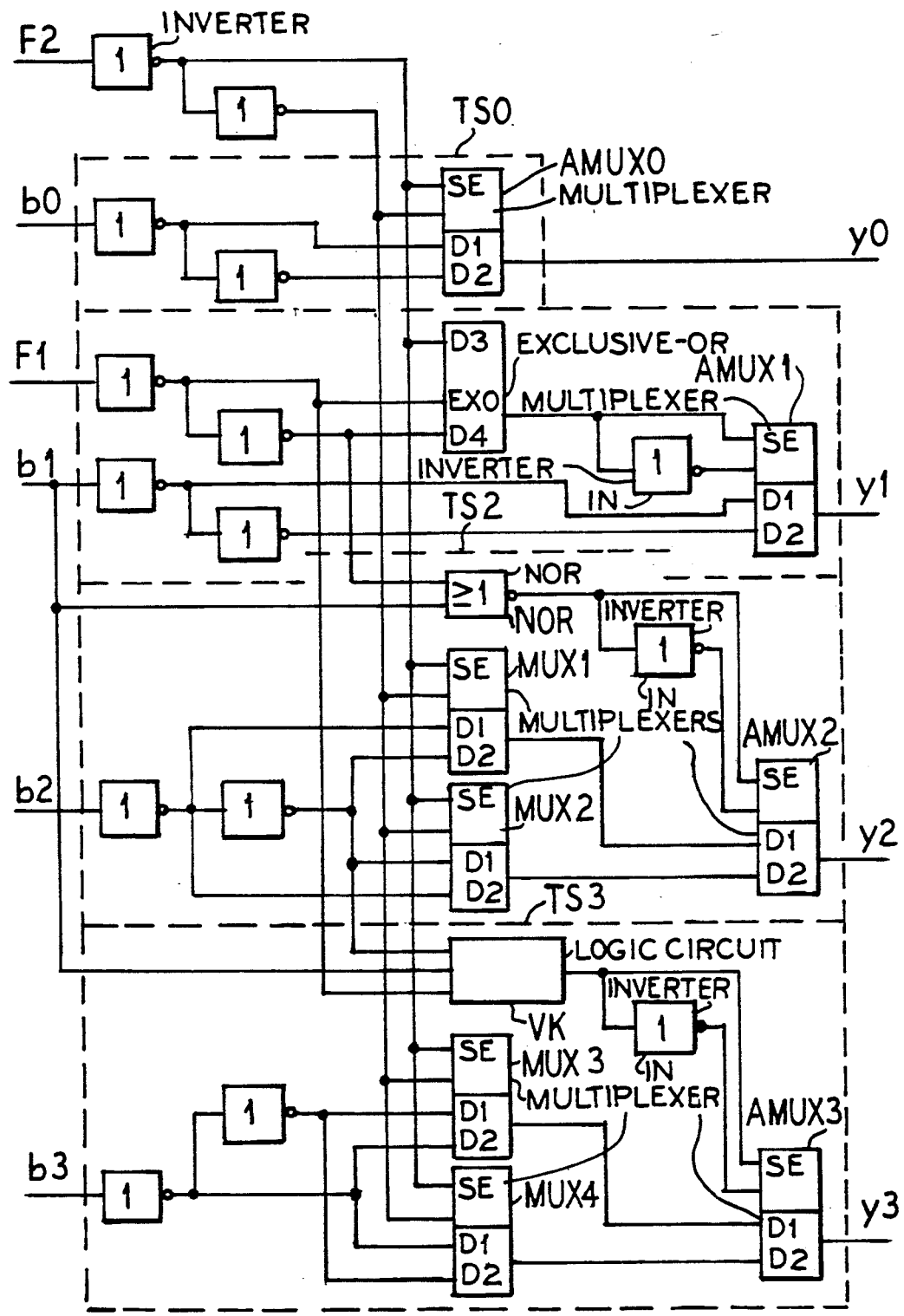
FIG. 2 the circuit diagram of one of the input stages.

A circuit that realizes these functions is shown in FIG. 2. It may be seen that this circuit is composed exclusively of multiplexers MUX and of logic elements, for example invertors IN or exclusive-OR circuits EX. In order to develop a correspondingly simply constructed input stage EG2 that executes the functions of Table 2, function equations must be erected for the individual instances. The function equations for the individual bits of the edited operand Y derive from Table 3. They are formed upon employment of the function signals F1, F2.

TABLE 3

$$y0 = \overline{F2}b0 = F2\overline{b0}$$

$$y1 = \overline{(\overline{F1}\ \overline{F2})b1} + (\overline{F1}\ \overline{F2})b1$$

$$y2 = \overline{(F1 + b1)}(F2b2 + \overline{F2}.\overline{b2}) + (F1 + b1)(\overline{F2b2} + F2\overline{b2})$$

$$y3 = ((b1 + b2)\overline{F1})(F2b3 + \overline{F2}.\overline{b3}) + ((b1 + b2)F1)(\overline{F2b3}) + (F2b3)$$

The input stage EG2 is composed of sub-circuits TS each of which respectively comprises at least one multiplexer that is referenced AMUX. The allocated bit of the operand B is respectively connected to the one data input of this output multiplexer AMUX. For example, the operand bit b0 at the output multiplexer AMUX0, the operand bit b1 at the output multiplexer AMUX1, etc. The allocated bit of the operand B is supplied inverted to the other data input of the output multiplexers AMUX. The through-connection of the allocated bit in uninfluenced or in inverted form ensues on the basis of the control signals at the input SE of the multiplexers AMUX.

Whether the one data input or the other data input of the output multiplexers AMUX is through-connected can be taken from the function equations of Table 3. In the first sub-circuit TS0 that realizes line 1 of Table 3, the allocated bit b0 of the operand B is through-connected unmodified. The distinction as to whether b0 or $\overline{b0}$ is to be through-connected is exclusively defined with the assistance of the function signal F2. In accord therewith, the output multiplexer AMUX0 of the first sub-circuit TS0 is supplied only with the function signal F2 at the control input SE.

The second sub-circuit TS1 is employed for generating the bit y1 from the bit b1. Both function signals F1 and F2 are required here for driving the output multiplexer AMUX1. The control signal for the output multiplexer AMUX1 is generated by exclusive-OR operation of the function signals F1 and F2 according to line 2 of Table 3. In addition to the output multiplexer AMUX1, the sub-circuit TS1 thus contains the exclusive-OR circuit EX0 and the inverter IN that are essentially conditioned by the structure of the multiplexer and of the exclusive-OR circuit.

The sub-circuit TS2 for generating the bit y2 from the bit b2 is more involved. Dependent on the control signals, the bit B2 of the operand B here must be applied either to the one data input D of the output multiplexer AMUX2 or to its other input D2 in non-inverted or inverted form. Further multiplexers MUX1 and MUX2 are employed for this purpose. The generation of the control signal for the output multiplexer AMUX2 ensues upon employment of the function signal F1 and of the bit b1 of the operand B. The control signal for the multiplexers MUX1 and MUX2 is acquired from the function signal F2. The connection of the signal b2 to the data inputs of the output multiplexer AMUX2 and the generation of the control signals for the multiplexers can be taken more precisely from the function equation for y2 in Table 3. In addition to comprising the output multiplexer AMUX2, thus, the sub-circuit TS2 comprises two further multiplexers MUX1 and MUX2, inverter and NOR element NOR0.

The sub-circuit TS3 for generating the bit y3 is likewise comparatively involved. The bit b3 either in non-inverted or inverted form is again connected to the data inputs of the output multiplexer AMUX3. The allocation ensues via multiplexers MUX3 and MUX4. The control inputs of the multiplexers MUX3 and MUX4 are again driven by the function signal F2. An operation signal that is acquired from the function signal F1, the bits b1 and b2 pends at the control input of the output multiplexer AMUX3. The operation can be derived from the equation for y3 in Table 3. The sub-circuit TS3 is thus likewise composed of three multiplexers with sum inverters IN and a logic circuit VK that operates the function signal F1 and the bits b1 and b2 of the operand B. This logic circuit is referenced VK and carries out an OR operation of the operand bits b1 and b2 and subsequently carries out an AND operation of the result of the OR operation and of the inverted function signal F1. The structure of such a logic circuit VK is known; for example, it can be simply realized with logic circuits.

Dependent on the function signals F1 and F2, the input stage EG2 thus carries out the editing of the operand B, namely such that the instances recited in the various columns of Table 1 are realized. The edited operand Y thus appears at the output of the input circuit EG2, this edited operand Y being subsequently operated with the edited operand X in the binary adder DA. It is thus irrelevant for the binary adder whether a BCD operation or a binary operation is to be implemented. It treats both instances identically.

As already set forth above, the operation result of the binary adder DA must be corrected in some BCD operations. The required condition has already been recited. The corresponding function table can be taken from Table 4:

| F3 | C | r0 | r1 | r2 | | r3 | |
|----|---|----|----|----|----|----|----|
| 0 | 0 | s0 | $\overline{s1}$ | s1 | s2 | $(\overline{s1} + \overline{s2})$ | s3 |
| 0 | 1 | s0 | s2 | s2 | | s3 | |
| 1 | 0 | s0 | s2 | s2 | | s3 | |
| 1 | 1 | s0 | s2 | s2 | | s3 | |

The various instances can be distinguished dependent on the carry signal C and on a function signal F3. The function signal F3 thereby indicates whether a BVD operation is present. When F3 is logical 0, then a BCD operation is present. A determination as to whether the result must be corrected or not in BCD operations can now be made with the assistance of the carry signal of the most significant bit place of the sum S. When the carry signal is logical 0, then the result S must be corrected, namely such that the number 6 is subtracted from the result. The function equations having the individual places of the sum result S recited in line 1 of Table 4 thus derive. The result of the correction is referenced R. For all other instances, the result S of the binary adder need not be corrected. This means that the result R at the output of the output stage AGS corresponds to the sum result S. According to Table 4, thus, corrections must be made only when the function signal F3 and the carry C are both logical 0; otherwise, no correction is carried out.

Figure 3:
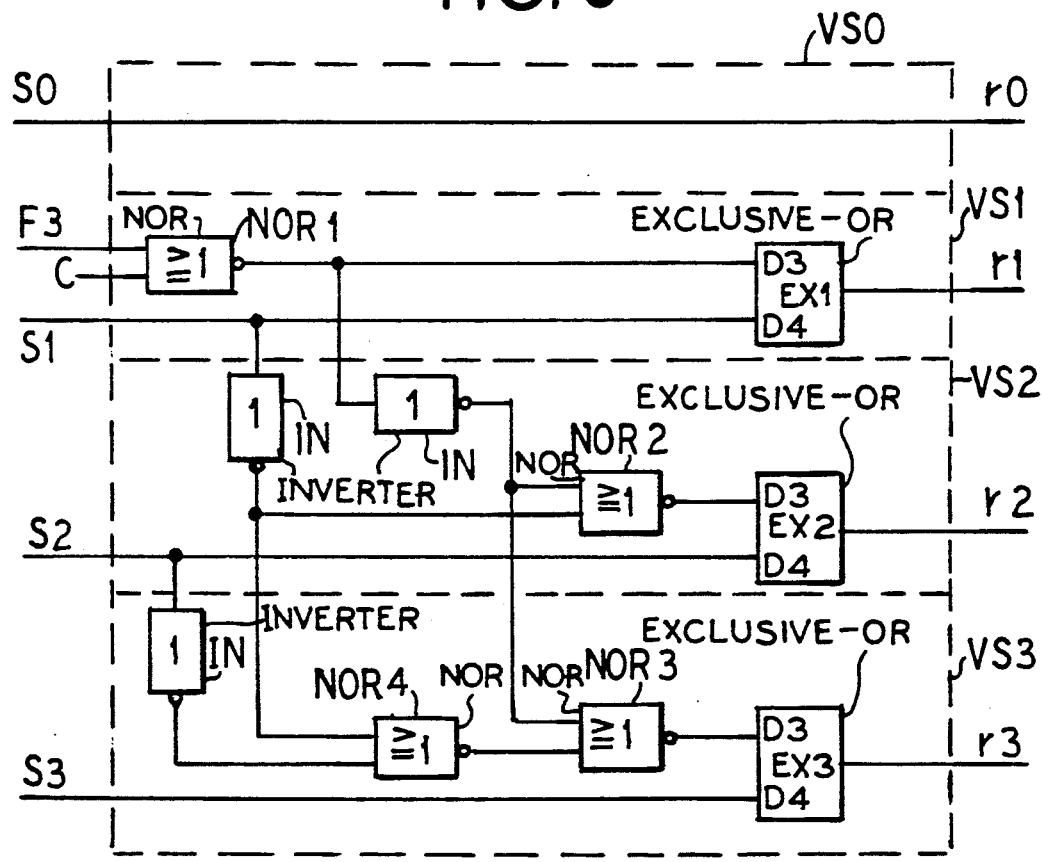
FIG. 3 the circuit diagram of the output stage.

A circuit arrangement with which the correction can be carried out may be derived from FIG. 3. This comprises a respective logic element VS for the various bits s0 through s3 of the sum result of the binary adder DA. The logic elements for the sum bits s1 through s3 thereby each respectively contain an exclusive-OR circuit EX1 through EX3. The allocated sum bit s1 through s3 is respectively supplied to the one input D4 of the exclusive-OR circuits EX1 through EX3: operations on the function bit F3, the carry signal C and, potentially, the bits s1 or, respectively, s2 are supplied to the other input D3.

The allocated function equations that are executed by the individual logic elements VS may be derived from Table 5.

$$r0 = s0$$
$$r1 = \overline{(F3 + c)} \; s1$$
$$r2 = \overline{(F3 + c + s1)} \; s2$$
$$r3 = \overline{(F3 + c + (\overline{s1} + \overline{s2}))} \; s3$$

The first, the least significant bit of the sum result s0, is not influenced and already yields the correct result r0. Only a line is required for this logic element VS0.

The second logic element, namely the logic element VS1, is composed of the exclusive-OR circuit EX1 and of an NOR element NOR1 that operates the function signal F3 and the carry signal C. The type of operation can be derived from line 2 of Table 5.

In addition to containing the exclusive-OR circuit EX2, the logic element VS2 contains a NOR element NOR2 that carries out an NOR operation of the function signal F3, of the carry signal C and of the inverted sum bit S1. The correct form of the individual signals is acquired with the assistance of invertors.

The generation of the signal r3 from the sum bit s3 ensues with the assistance of the logic element VS3 that, in addition to comprising the exclusive-OR circuit EX3, comprises further NOR elements NOR3 and NOR4. The bits s1 and s2 are operated with one another with the NOR element NOR4; the result of the operation of the NOR element NOR4 is operated with the function signal F3 with the NOR element NOR3. The correct value of these signals is again produced via inverters IN. The type of operation can be derived from line 4 of Table 5.

It may seen that the output stage AGS contains logic elements VS1 through VS3 that each respectively comprise an exclusive-OR circuit EX, NOR elements NOR and inverters IN.

The input stage EG2 of FIG. 2 and the output stage AGS of FIG. 3 comprise regular structures and are composed of only a few different cells, for example multiplexers MUX, exclusive-OR circuits EX, NAND- and NOR-elements and inverters. Circuits constructed in this fashion can be easily employed in CAD systems.

Figure 4:
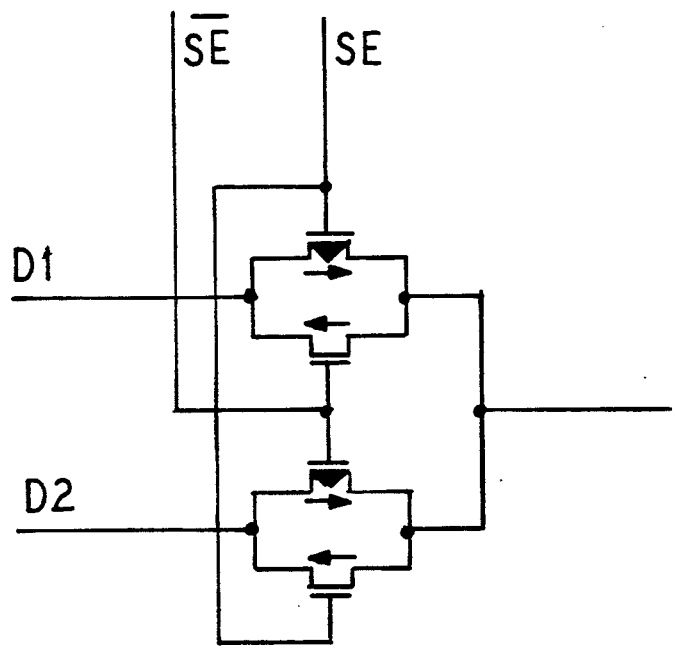
FIG. 4 the realization of the multiplexer circuit employed.
Figure 5:
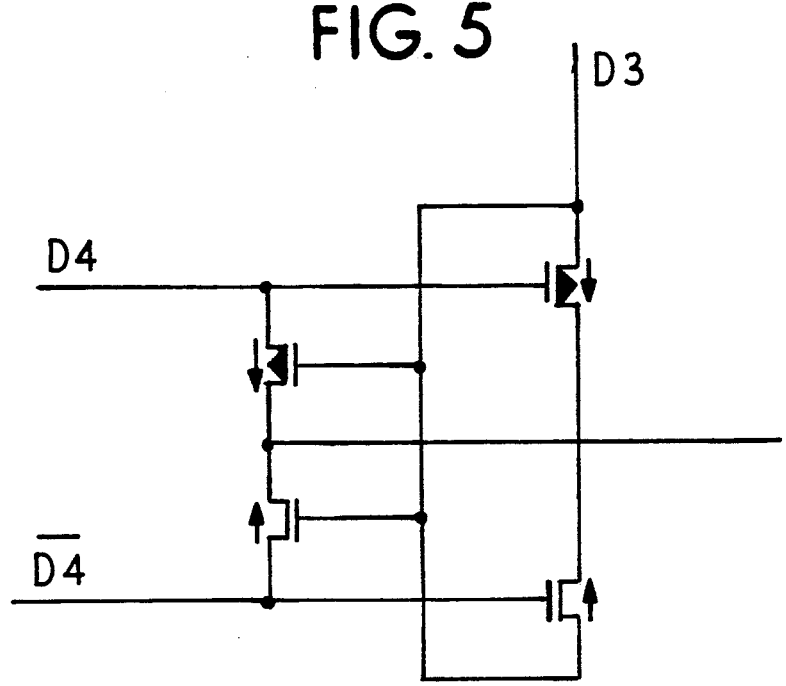
FIG. 5 the realization of an EXOR circuit employed.

The recited circuits, moreover, can be constructed in CMOS technology, for example as shown for the multiplexer in FIG. 4 and for the exclusive-OR circuit in FIG. 5. The result is that few transistors are needed for these circuits and the circuits can be implemented in surface-saving fashion. In that only very few logic elements are needed overall for the various operation modi, the running times can be kept extremely short.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. A circuit arrangement for adding or subtracting 4-bit first and second operands coded in one of binary coded decimal or binary code upon employment of a binary adder, comprising:
   (a) a first input stage having an output connected to a first input of the binary adder, said first input stage receiving the first operand, said first input stage having means for adding the number 6 to said first operand given operations of binary coded decimal operands with positive operands;
   means for adding the number 6 to said first operand given negative operands and negating the result of the addition;
   means for not modifying said operand given different operational signs of the two operands and a positive operational sign of said first operand;
   means for negating said first operand given different operational signals of the two operands given negative operational signal of said first operand;
   means for negating said first operand but not otherwise modifying said first operand given operations of operands in the binary code with a negative said first operand;
   (b) a second input stage for receiving the second operand, said second input stage having, when receiving a negative, second operand, means for negating the second operand but otherwise leaving the second operand unmodified, said second input stage having an output connected to a second input of the binary adder;
   (c) an output stage connected to a sum output of the binary adder, said output stage having, given binary coded decimal operations of the first and second operands and an absence of a carry on a carry output of the binary adder, means for subtracting the number 6 from a sum result on the sum output of the binary adder in order to generate a corrected sum but otherwise said output stage through-connecting the sum result.

2. The circuit arrangement according to claim 1, wherein the first input stage has two function inputs for receiving first and second function signals, F1, F2; wherein the first function signal defines whether or not the number 6 is added to the first operand; and wherein the second function signal defines whether or not the first operand is negated.

3. The circuit arrangement according to claim 2, wherein the first input stage, has:
   a first sub-circuit that generates an edited bit, y0, according to the equation $$y0 = F2b0 + F2\overline{b0}$$

from the least significant bit, b0, of the first operand;
   a second sub-circuit that generates an edited bit, y1, according to the equation $$y1 = (\overline{F1 \quad F2})\overline{b1} + (F1 \quad F2)b1$$

from the next, more significant bit, b1, of the first operand;
   a third sub-circuit that generates an edited bit, y2, according to the equation $$y2 = \overline{(F1+b1)}(F2b2+\overline{F2b2}) + (F1+b1)(F2\overline{b2}+\overline{F2}b2)$$

from the next, more significant bit, b2, of the first operand; and a fourth sub-circuit that generates an edited bit, y3, according to the equation $$y3 = ((b1+b2)\overline{F1})(F2b3+\overline{F2b3}) + ((b1+B2)\overline{F1})(F2\overline{b3}+\overline{F2}b3)$$

from the most significant bit, b3, of the first operand.

4. The circuit arrangement according to claim 3, wherein the first sub-circuit is composed of an output multiplexer which has a control input for receiving the second function signal in inverted form and a first data input for receiving the least-significant bit, b0, of the first operand in inverted form and a second data input for receiving the least-significant bit, b0, in non-inverted form.

5. The circuit arrangement according to claim 3, wherein the second sub-circuit has an output multiplexer which has a first data input for receiving the more significant bit, b1, of the first operand inverted and a second data input for receiving the more significant bit, b1 non-inverted and a control input for receiving an output signal of a first exclusive-OR circuit, this first exclusive-OR circuit receiving the second function signal inverted and the first function signal inverted.

6. The circuit arrangement according to claim 3, wherein the third sub-circuit has an output multiplexer, a first multiplexer, a second multiplexer and an NOR element; wherein control inputs of the first and second multiplexers, respectively, are driven by the second function signal inverted; wherein the more significant bit, b2, of the first operand is received inverted at a first data input of the first multiplexer and at a second data input of the second multiplexer and is received non-inverted at a second data input of the first multiplexer and at a first data input of the second multiplexer; wherein an output of the first multiplexer is connected to a first data input of the output multiplexer, and an output of the second multiplexer is connected to a second data input of the output multiplexer; and wherein a signal that is formed by NOR operation of the first function signal and of the less significant bit, b1, of the first operand is received at a control input of the output multiplexer.

7. The circuit arrangement according to claim 3, wherein the fourth sub-circuit has an output multiplexer, a third multiplexer and a fourth multiplexer and a logic element; wherein the second function signal inverted is received at control inputs of the third multiplexer and fourth multiplexer; wherein the most significant bit, b3, of the first operand is received at a first data input of the third multiplexer and at a second data input of the fourth multiplexer; wherein the most significant bit, b3, is received inverted at the second data input of the third multiplexer and at the first data input of the fourth multiplexer; wherein a first data input of the output multiplexer is connected to an output of the third multiplexer, and a second data input is connected to an output of the fourth multiplexer; and wherein a signal that is formed by the logic element by an inverted AND operation of the first function signal inverted and an OR-operation between the two next, less significant bits, b1, b2, of the first operand is received at a control input of the output multiplexer.

8. The circuit arrangement according to claim 1, wherein the output stage has,
   a first logic element that through-connects a least significant bit, s0, of the sum result to an output of the output stage as a least-significant bit, r0, of the corrected sum;
   a second logic element that generates a next, more significant bit, r1, of the corrected sum from a next, more significant bit, s1, of the sum result according to the equation $$r1 = \overline{(F3+c)} \ s1;$$

a third logic element that generates a next, more significant bit, r2, of the corrected sum from a next, more significant bit, s2, of the sum result according to the equation $$r2 = \overline{(F3+c+s1)} \ s2;$$

a fourth logic element that generates a most significant bit, r3, of the corrected sum according to the equation $$r3 = \overline{(F3+c+\overline{(s1+s2)})} \ s3$$

from a most significant bit, s3, of the sum result, whereby c is a carry of the sum result, and F3 is a function signal for indicating a binary coded decimal operation.

9. The circuit arrangement according to claim 8, wherein the second logic element is composed of an exclusive-OR circuit and of an NOR element; wherein the NOR element is connected to a first input of the exclusive-OR circuit and performs an operation on the function signal, F3, and a carry signal of the carry, c; and wherein the allocated sum bit, s1, is received at a second input of the exclusive-OR circuit.

10. The circuit arrangement according to claim 8, wherein the third logic element is composed of an exclusive-OR circuit and of an NOR element; wherein the bit, s2, of the sum result is connected to a first input of the exclusive-OR circuit and an output of the NOR element is connected to a second input of the exclusive-OR circuit; and wherein the NOR element performs an operation on an inverted NOR operation of the function signal, F3, and of a carry signal of the carry, c, and on the next, less significant bit, s1, of the sum result in inverted form.

11. The circuit arrangement according to claim 8, wherein the third logic element is composed of an exclusive-OR circuit and of two NOR elements; wherein the bit, s3, of the sum result is received at a first input of the exclusive-OR circuit and an output of one NOR element of the two NOR elements is connected to a second input of the exclusive-OR circuit; wherein the other NOR element of the two NOR elements performs an operation on the two bits, s1, s2, each inverted, of the sum result; and wherein the one NOR element performs an operation on an output signal of the other NOR element and on an inverted NOR-operation of the function signal, F3, and of a carry signal of the carry, c.

* * * * *